United States Patent Office 3,382,281
Patented May 7, 1968

3,382,281
PROCESS FOR THE PRODUCTION OF AZINES
Alfons Jankowski and Siegfried R. Paulsen, Essen-Kray, and Georg Huck, Dortmund-Eving, Germany, assignors to Bergwerksverband G.m.b.H., Essen, Germany
No Drawing. Filed Aug. 6, 1964, Ser. No. 387,981
Claims priority, application Germany, Jan. 18, 1964, B 75,054
9 Claims. (Cl. 260—566)

This invention relates to processes for the production of azines from diazacyclopropanes.

It is known to hydrolyze diazacyclopropanes with strong acids, preferably mineral acids. This hydrolysis can be represented by the following equation:

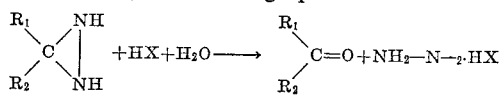

wherein HX represents 1 equivalent of an acid, such as sulfuric or hydrochloric acid. The product of the acid hydrolysis is a salt, such as hydrazine hydrochloride or dihydrazine sulfate.

Two equivalents of a strong acid are generally used in the hydrolysis per mol of diazacyclopropane in order to obtain a monohydrazine sulfate. The rate of the hydrolysis reaction can be increased by lowering the pH. However, azines have not hitherto been produced from diazacyclopropanes.

It has now been found possible by means of the process of the invention to convert diazacyclopropanes to azines, not only keto-azines but also aldo-azines.

The invention relates to the production of azines of the general formula:

$$R_1 \diagdown \atop R_2 \diagup C=N-N=C \diagup R_3 \atop \diagdown R_4$$

wherein $R_1$ and $R_3$ represent a hydrogen atom or an alkyl group of up to 6 carbon atoms and $R_2$ and $R_4$ represent an alkyl group of up to 6 carbon atoms or a phenyl group, or $R_1$, together with $R_2$ and/or $R_3$ together with $R_4$ respectively form a ring with 4 to 5 methylene groups.

According to the invention, a diazacyclopropane of the general formula:

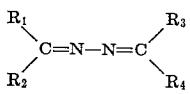

wherein $R_1$ and $R_2$ are as defined above, is treated with an acid material. Preferably a carbonyl compound of the general formula is added to the diazacyclopropane:

$$R_3 \diagdown \atop R_4 \diagup C=O$$

wherein $R_3$ and $R_4$ are as defined above.

The probable course of the reactions is shown by the following equations, showing the reaction (a) in the presence and (b) in the absence of a carbonyl compound.

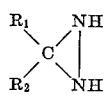

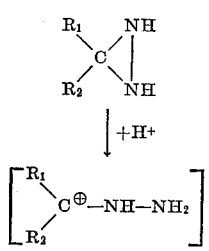

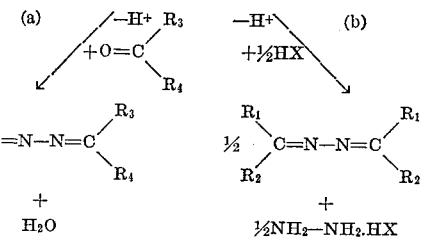

In equation (b) the hydrazine salt of the acid is formed in addition to the azine. Any desired ratio between hydrazine salt and azine can be obtained by using a selected amount of carbonyl compound which is less than the stoichiometric amount.

Good yields of the azine can best be obtained by reacting 1 mol of the diazacyclopropane with 1 mol of the carbonyl compound. Even better results can be obtained by using a stoichiometric excess of the carbonyl compound, preferably between 1.5 and 15 mols.

As substituents of the diazacyclopropane to be used as starting materials, there may be used branched or unbranched alkyl groups, phenyl groups or methylene rings. Suitable starting materials include 3-methyl-3-ethyl-diazacyclopropane,
3,3-diethyl-diazacyclopropane,
3-methyl-3-isopropyl-diazacyclopropane,
3-methyl-3-isobutyl-diazacyclopropane,
3-amyl-3-ethyl-diazacyclopropane,
3,3-dimethyl-diazacyclopropane,
1,2-diazaspiro(2,5)-octane,
3-phenyl-diazacyclopropane and
3,3-dipropyl-diazacyclopropane.

If a carbonyl compound is not used in the reaction, then the azines formed are symmetrical, i.e. $R_3=R_1$ and $R_2=R_4$ (see Equation (b) above). If a carbonyl compound is reacted, symmetrical or unsymmetrical azines can be produced, depending on whether the carbonyl compound used in the process of the invention is the same or different from the carbonyl compound previously used to form the diazacyclopropane. It is preferred to use the same carbonyl compound, whether aldehyde or ketone. Suitable carbonyl compounds include acetone, butanone, 3-pentanone, methyl-isopropyl ketone, 4-methyl-2-pentanone, 4-heptanone, amyl-ethyl ketone (3-octanone), cyclohexanone, butyraldehyde, benzaldehyde and phenylmethyl ketone.

As catalysts there may be used acids, especially mineral acids such as sulfuric or hydrochloric acids or other inorganic acids such as phosphoric or boric acid, or organic acids such as maleic, benzoic or acetic acid or acid ion-exchangers. Aqueous solutions of acid salts such as potassium hydrogen sulphate, sodium hydrogen sulphate or hydrazine sulphate may also be used as catalysts.

The amount of acid material added as a catalyst in the process of the invention should be smaller than that needed for forming dihydrazine salts by hydrolysis. The amount of acid material used should generally therefore be less than 1 equivalent and preferably between 0.05 to 0.5 equivalents. Even smaller amounts than 0.05 of an equivalent may be used in some cases. In any event, the acid constituent in the reactive solution should determine a pH of about 0.5 to about 5.

When the catalyst used is an acid salt, more than 1 equivalent thereof can be used under certain conditions. In such cases the aqueous solution of the acid salt can be separated at the end of the reaction and recirculated as a catalyst in the reaction of further amounts of diazacyclopropane and carbonyl compound. Hydrazine sulfate is particularly suitable as an acid salt.

When acids are used as catalysts, they are preferably used in as small amounts as possible, since the acid forms a corresponding amount of hydrazine salt, which reduces the yield of azine. In this case, also, the hydrazine salt solution formed can be separated after the reaction and reused as a catalyst for further reactions. In addition to the azine, variable amounts of hydrazine salts may also be produced in proportion to the amount of acid used.

The temperature of the reaction is preferably maintained at between 20 and 100° C., but temperatures outside these limits are also effective. As would be expected, however, the reaction time required is reduced with an increase in temperature. The speed of reaction at temperatures between 20 and 80° C. is generally sufficiently high to enable the reaction to be completed in about 10 to 20 minutes. The azines formed can be directly recovered by separation and distillation of the organic phase.

The azines are a valuable starting material for a large number of technically important hydrazine derivatives. By hydrogenation of the azines it is possible to obtain for example the following alkyl hydrazines.

$$\underset{R}{\overset{R}{\diagdown}}C=N-N=C\underset{R}{\overset{R}{\diagup}} \xrightarrow{cat.\ H_2} \underset{R}{\overset{R}{\diagdown}}\underset{H}{\overset{|}{C}}-NH-NH-\underset{H}{\overset{|}{C}}\underset{R}{\overset{R}{\diagup}}$$

Further, the azines can be addition of prussic acid be converted into known foaming agents $$\underset{R}{\overset{R}{\diagdown}}C=N-N=C\underset{R}{\overset{R}{\diagup}} + 2HCN \longrightarrow$$

$$\underset{R}{\overset{R}{\diagdown}}\underset{CN}{\overset{H}{|}}C-\underset{|}{\overset{H}{N}}-\underset{CN}{\overset{|}{N}}-C\underset{R}{\overset{R}{\diagup}} \xrightarrow{-H_2} \underset{R}{\overset{R}{\diagdown}}\underset{CN}{\overset{|}{C}}-N=N-\underset{CN}{\overset{|}{C}}\underset{R}{\overset{R}{\diagup}}$$

Also monoalkyl hydrazines, particularly methyl hydrazine can be produced from azines by conversion with dimethyl sulfate $$\underset{R}{\overset{R}{\diagdown}}C=N-N=C\underset{R}{\overset{R}{\diagup}} + (CH_3)_2SO_4 \longrightarrow$$

$$\underset{R}{\overset{R}{\diagdown}}C=N-\underset{CH_3}{\overset{|}{N}}=C\underset{R}{\overset{R}{\diagup}} \xrightarrow{2H_2O} NH_2N\underset{H}{\overset{CH_3}{\diagdown}} + 2 \underset{R}{\overset{R}{\diagdown}}C=O$$
$$CH_3.SO_4$$

The following specific examples are provided to illustrate the invention. The parts referred to are by weight.

EXAMPLE 1

A mixture of 31.8 parts (0.06 mol=0.12 equivalents) of 4 N sulfuric acid and 36 parts (0.5 mol) of methyl-ethyl ketone was stirred at 70° C. and a solution was added thereto containing 86 parts (1 mol) of 3-methyl-3-ethyl-diazacyclopropane in 72 parts (1 mol) of methyl-ethyl ketone. The latter solution was added over a period of 20 minutes, and in such small proportions that the resultant reaction mixture remained acid (pH=3 to 4) for the whole period.

The organic phase of the reaction mixture was then separated. The excess methyl-ethyl ketone was distilled off and there were obtained 130.5 parts of methyl-ethyl keto-azine; this represents a yield of 93.2% of the theoretical. The aqueous phase also contained 7.2 parts of hydrazine sulfate.

EXAMPLE 2

A solution of 13 parts (0.1 mol) of hydrazine sulfate in 100 parts of water and 36 parts (0.5 mol) of methyl-ethyl ketone was stirred at 60° C., and there were added thereto 86 parts (1 mol) of 3-methyl-3-ethyl-diazacyclopropane and 288 parts (4 mols) of methyl-ethyl ketone. The addition was carried out over 20 minutes, and in such small proportions that the reaction mixture remained acid (pH=3 to 4).

The organic phase was then separated and it comprised 131.5 parts of methyl-ethyl keto-azine, a yield of 93.8% of the theoretical. The aqueous phase contains in addition to the starting material hydrazine sulfate; also 3.65 parts of methyl-ethyl-keto-azine.

EXAMPLE 3

A solution of 12 parts (0.2 mols=0.2 equivalents) of acetic acid in 150 parts of water was stirred at 60° C., and 144 parts (2 mols) of 3,3-dimethyl-diazacyclopropane were dropped thereinto over a period of 20 minutes.

The resultant organic phase was separated and contained 68.1 parts of dimethyl keto-azine, a yield of 60.8% of the theoretical. The aqueous phase contained 16.0 parts of hydrazine acetate.

EXAMPLE 4

350 parts (0.35 mol=0.7 equivalents) of 2 N sulfuric acid were added with stirring at 80° C. with 100 parts (1 mol) of 3,3-diethyl-diazacyclopropane, in such small amounts that the reaction mixture remained acid during the entire reaction (pH=2 to 3). The temperature was maintained at 80° C. for 15 minutes. The reaction mixture was subsequently cooled to 20° C. and the organic phase separated. It contained 75.5 parts of diethyl keto-azine, 90% of the theoretical yield. The aqueous phase contained 39.5 parts of hydrazine sulfate, 60.8% of the theoretical.

EXAMPLE 5

A solution of 9.8 parts (0.1 mol) of phosphoric acid in 100 parts of water and 19.6 parts (0.2 mol) of cyclohexanone were stirred at 80° C. and a solution of 112 parts (1 mol) of 1,2-diaza-spiro (2,5)-octane in 98 parts (1 mol) of cyclohexanone were dropped thereinto.

The organic phase contained 157 parts of cyclohexane keto-azine, 81% of the theoretical yield.

EXAMPLE 6

A solution of 13.6 parts (0.1 mol) of potassium hydrogen sulfate in 100 parts of water and 36 parts (0.5 mol) of butyraldehyde were stirred at 60° C. and a solution of 128 parts (1 mol) of 3,3-dipropyl-diazacyclopropane in 72.1 parts (1 mol) of butyraldehyde were dropped thereinto in such amounts that the pH did not rise above 5.

The separated organic phase contained 133.5 parts of the mixed azine derived from heptanone and butyraldehyde, a yield of 73.5% of the theoretical.

EXAMPLE 7

50 parts (0.5 mol) of 2 N sulfuric acid were stirred at 70° C. and 86 parts (1 mol) of 3-methyl-3-ethyl-diazacyclopropane were dropped thereinto at such a rate that the reaction medium remained acid. 59.1 parts of methyl-ethyl keto-azine were obtained, amounting to 84.6% of the theoretical.

EXAMPLE 8

To a slurry of 10 parts by weight of strong acid ion-exchanger in 100 parts by weight of water there is added, at 70–80° C. while stirring, a solution of 86 parts by weight of c-methyl-c-ethyl-diazacyclopropane in 288 parts by weight of methyl-ethyl-ketone. After 1 hour the portion of methyl-ethyl-keto-azine in the organic phase amounts to 122 parts by weight, corresponding to 87.2% of theoretical yield.

There has thus been illustrated above novel processes for the production of azines from diazacyclopropanes.

What is claimed is:

1. A process for the production of an azine of the formula:

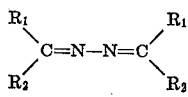

wherein $R_1$ is selected from the group consisting of hydrogen and an alkyl group of up to 6 carbon atoms and $R_2$ is selected from the group consisting of an alkyl group of up to 6 carbon atoms and a phenyl group, or $R_1$ together with $R_2$ forms a ring with 4 to 5 methylene groups, said process comprising: treating at a temperature of 20–100° C. a diazacyclopropane of the formula:

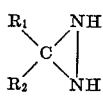

wherein $R_1$ and $R_2$ are as defined above, in the presence of an acid which leads to a pH value of 0.5 to about 5.

2. A process for the production of an azine of the formula:

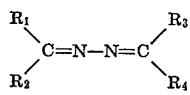

wherein $R_1$ and $R_3$ are selected from the group consisting of hydrogen and an alkyl group of up to 6 carbon atoms, $R_2$ and $R_4$ are selected from the group consisting of an alkyl group of up to 6 carbon atoms and a phenyl group, or $R_1$ together with $R_2$ and/or $R_3$ together with $R_4$ form a ring with 4 to 5 methylene groups, said process comprising: reacting to a temperature of 20° C.–100° C. a diazacyclopropane of the formula:

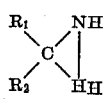

wherein $R_1$ and $R_2$ are as defined above, with a carbonyl compound of the formula:

wherein $R_3$ and $R_4$ are as defined above in the presence of an acid.

3. A process according to claim 2, in which between 0.05 and 0.5 mol of said acid material is used per mol of diazacyclopropane.

4. A process according to claim 2 wherein the carbonyl compound used is the same as that used to form the diazacyclopropane to thereby form a symmetrical azine.

5. A process according to claim 2 in which the carbonyl compound is used in a proportion of between 1 to 15 mols per mol of diazacyclopropane.

6. A process according to claim 2 in which the carbonyl compound is used in a proportion of less than 1 mol of diazacyclopropane to produce an azine or mixture of azines and the hydrazine salt of the acid material.

7. A process according to claim 2, wherein the carbonyl compound is an aldehyde selected from the group consisting of butyraldehyde and benzaldehyde.

8. A process according to claim 2, in which the acid material is sulfuric acid.

9. A process according to claim 2, in which the acid material is hydrazine sulfate.

References Cited

UNITED STATES PATENTS 3,144,486  8/1964  Abendroth _____ 260—239 X

FOREIGN PATENTS 1,107,238  5/1961  Germany.
598,822  2/1948  Great Britain.
890,334  2/1962  Great Britain.

OTHER REFERENCES

Paulsen et al., Berichte, vol. 94, pp. 968–75 (1961).

CHARLES B. PARKER, *Primary Examiner.*

R. V. HINES, *Assistant Examiner.*